United States Patent
Nedachi et al.

(10) Patent No.: US 8,788,169 B2
(45) Date of Patent: Jul. 22, 2014

(54) CLUTCH CONTROL DEVICE

(75) Inventors: Yoshiaki Nedachi, Saitama (JP); Yoshiaki Tsukada, Saitama (JP); Takashi Ozeki, Saitama (JP); Hiroyuki Kojima, Saitama (JP); Kazuyuki Fukaya, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1217 days.

(21) Appl. No.: 12/433,102

(22) Filed: Apr. 30, 2009

(65) Prior Publication Data
US 2009/0299590 A1   Dec. 3, 2009

(30) Foreign Application Priority Data
May 27, 2008   (JP) .................. 2008-137982

(51) Int. Cl.
- G06F 7/00 (2006.01)
- G06F 17/00 (2006.01)
- G06F 19/00 (2011.01)
- F16D 48/08 (2006.01)
- F16D 48/06 (2006.01)

(52) U.S. Cl.
CPC ........ F16D 48/08 (2013.01); F16D 2500/3024 (2013.01); F16D 2500/3127 (2013.01); F16D 2500/3022 (2013.01); F16D 2500/1117 (2013.01); F16D 2500/70605 (2013.01); F16D 2500/3115 (2013.01); F16D 2500/3111 (2013.01); F16D 2500/31426 (2013.01); F16D 48/066 (2013.01)
USPC .......................................................... 701/68

(58) Field of Classification Search
USPC ...................................................... 701/67, 68
See application file for complete search history.

(56) References Cited

U.S. PATENT DOCUMENTS

| | | | | |
|---|---|---|---|---|
| 6,053,842 | A | * | 4/2000 | Kitada et al. ................ 477/5 |
| 6,263,273 | B1 | * | 7/2001 | Henneken et al. .......... 701/51 |
| 2002/0042327 | A1 | | 4/2002 | Reuschel et al. |
| 2006/0106520 | A1 | | 5/2006 | Bodin et al. |
| 2007/0056784 | A1 | * | 3/2007 | Joe et al. ..................... 180/65.2 |

FOREIGN PATENT DOCUMENTS

| | | |
|---|---|---|
| DE | 102006037389 A1 | 2/2008 |
| EP | 2042768 A1 | 4/2009 |
| JP | 2004-197842 | 7/2004 |
| WO | 2007064187 A1 | 6/2007 |

* cited by examiner

Primary Examiner — Jeffrey Shapiro
(74) Attorney, Agent, or Firm — Squire Patton Boggs (US) LLP

(57) ABSTRACT

A clutch control device is provided for a clutch to connect and disconnect the transmission of a rotational drive force from a power source to a drive wheel in a vehicle. A clutch control unit is configured to control a control amount for said clutch. A drive wheel rotation start detector is configured to detect a start of rotation of said drive wheel. A control correction amount calculator is configured to calculate a control correction amount of said clutch based on a difference between the clutch control amount detected at the start of rotation of said drive wheel and a predetermined reference value. The clutch control unit is further configured to apply said control correction amount to the control amount for said clutch to control said clutch.

24 Claims, 7 Drawing Sheets

US 8,788,169 B2

CLUTCH CONTROL DEVICE

FIELD

The invention relates to a clutch control device. In particular, the invention relates to a clutch control device which can calculate a control correction amount according to a clutch control amount at starting of rotation of a drive wheel and can properly correct the clutch control amount by using the control correction amount calculated above.

BACKGROUND

Generally a clutch device has friction plates (clutch plates or clutches) for transmitting a torque from a power source to a drive wheel by a frictional force and an actuator for driving the friction plates. For example, when the clutch plates in such a clutch device are worn (e.g. reduced in thickness), there is a possibility that the same frictional force cannot be obtained with the same driving amount by the actuator. Such a problem can be solved by detecting the amount of movement of the clutch plates from their separate position to their contact position and increasing the driving amount by the actuator according to an increase in the amount of movement of the clutch plates.

Japanese Patent Application No. 2004-197842 generally discusses a configuration that detects the amount of movement of the clutch plates according to a position of a member displaced by an actuator. Even though the timing of engagement of the clutch can be detected by the technique described in Japanese Patent Application No. 2004-197842, there is a possibility that a clutch control amount at starting of rotation of the drive wheel may be varied due to variations in quality of the clutch in manufacturing or an increase in friction in a driving force transmitting system. For example, when a larger clutch control amount is required to start the rotation of the drive wheel, it may be desirable that the clutch control amount can be suitably corrected so as to eliminate the above variations to make a vehicle operation feel more stable in such a manner that the operator does not feel a delay in response at starting.

SUMMARY

In accordance with an embodiment of the invention, a clutch control device can be provided for a clutch to connect and disconnect the transmission of a rotational drive force from a power source to a drive wheel in a vehicle. The clutch control device can include a clutch control means for controlling a control amount of said clutch. The clutch control device can include a drive wheel rotation start detecting means for detecting a start of rotation of said drive wheel. The clutch control device can include a control correction amount calculating means for calculating a control correction amount of said clutch based on a difference between the clutch control amount detected at the start of rotation of said drive wheel and a predetermined reference value. The clutch control means applies said control correction amount to the control amount of said clutch to control said clutch.

In accordance with another embodiment of the invention, a clutch control device can be provided for a clutch to connect and disconnect the transmission of a rotational drive force from a power source to a drive wheel in a vehicle. The clutch control device can include a clutch control unit configured to control a control amount for said clutch. The clutch control device can include a drive wheel rotation start detector configured to detect a start of rotation of said drive wheel. The clutch control device can include a control correction amount calculator configured to calculate a control correction amount of said clutch based on a difference between the clutch control amount detected at the start of rotation of said drive wheel and a predetermined reference value. The clutch control unit is further configured to apply said control correction amount to the control amount for said clutch to control said clutch.

In accordance with another embodiment of the invention, a clutch control method for connecting and disconnecting the transmission of a rotational drive force from a power source to a drive wheel in a vehicle. The clutch control method includes controlling, by a clutch control unit, a control amount for said clutch. The clutch control method includes detecting, by a drive wheel rotation start detector, a start of rotation of said drive wheel. The clutch control method includes calculating, by a control correction amount calculator, a control correction amount for said clutch based on a difference between the clutch control amount detected at the start of rotation of said drive wheel and a predetermined reference value. The clutch control method includes applying, by said clutch control unit, said control correction amount to the control amount of said clutch to control said clutch.

DESCRIPTION OF THE PREFERRED EMBODIMENTS

Figure 1:
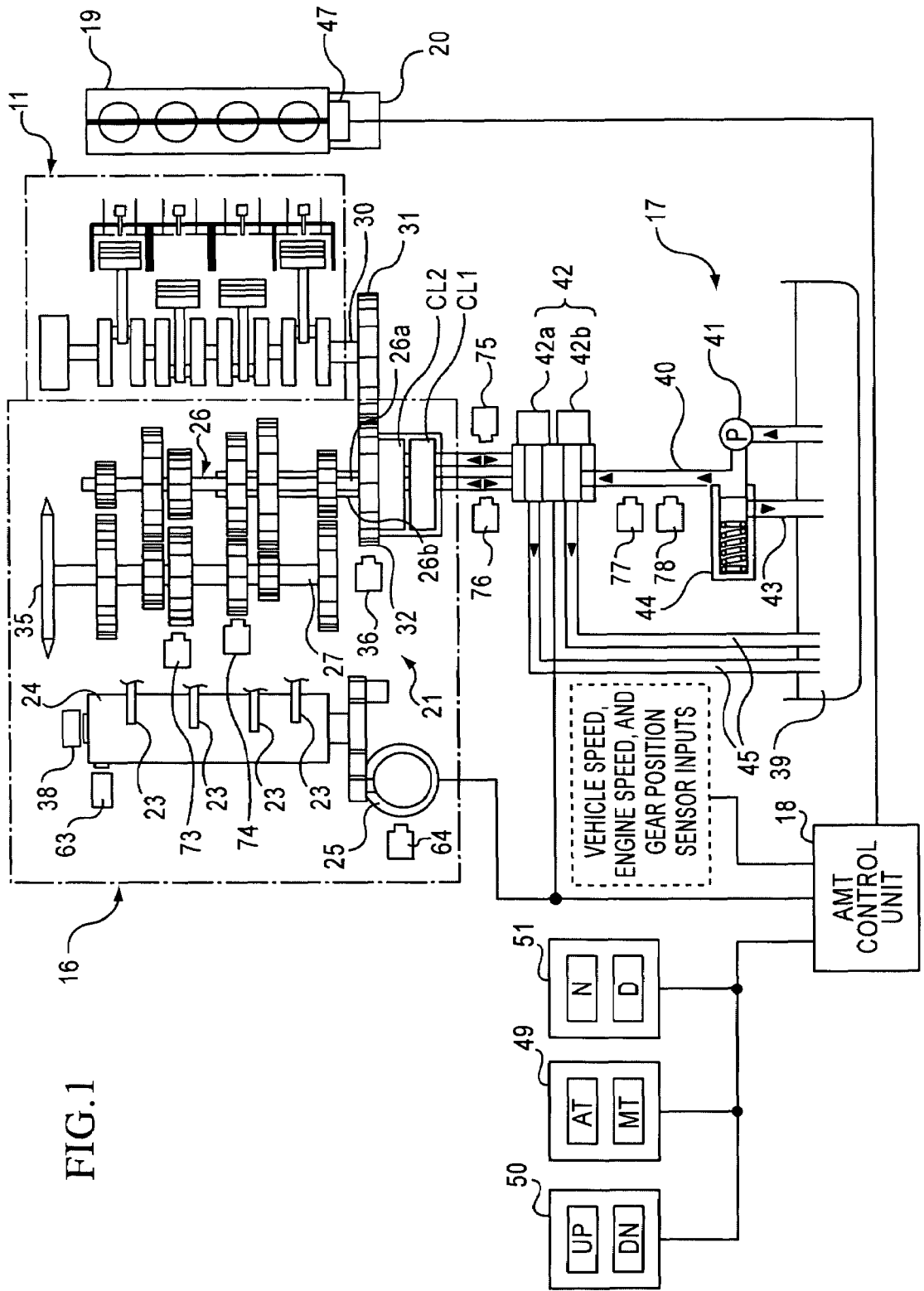
FIG. 1 is a schematic diagram showing a system configuration of an AMT and its peripheral devices according to an embodiment of the invention.
Figure 2:
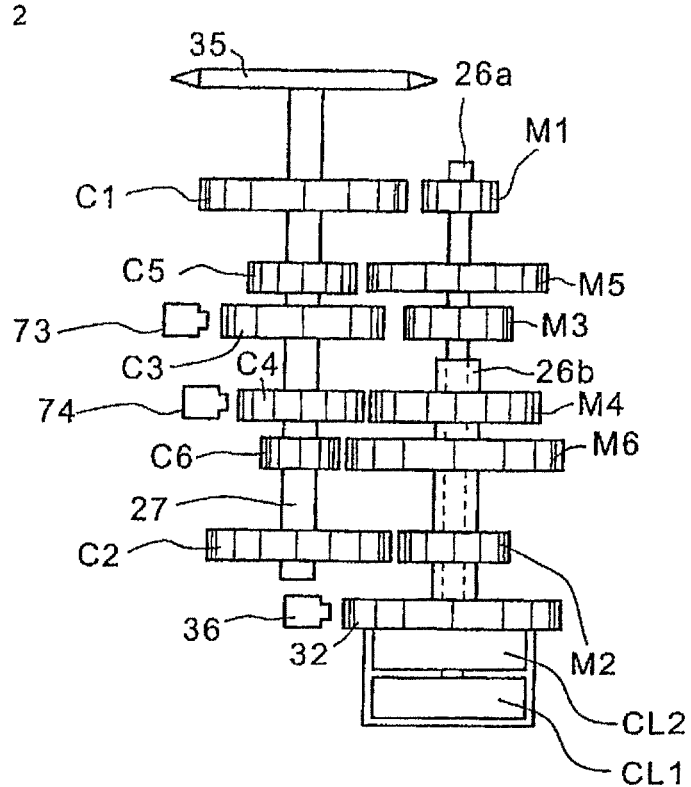
FIG. 2 is a layout diagram showing shafts and shift gear meshing in the AMT.

A clutch control device according to some embodiments of the invention will now be described in detail with reference to the drawings. FIG. 1 is a schematic diagram showing a system configuration of an automatic manual transmission (AMT) 16 as an automatic transmission and its peripheral devices applied to a motorcycle. FIG. 2 is a layout diagram showing shafts and shift gears meshing in the AMT 16. The AMT 16 can be a twin clutch type transmission having two clutches provided on a main shaft that may connect and disconnect the transmission of a rotational drive force from an engine. The AMT 16 can be connected to an engine 11, and can be controlled in operation by a clutch hydraulic device 17 and an AMT control unit 18 as a shift control device. The engine 11 can have a throttle-by-wire type throttle body 19. The throttle body 19 can be provided with a throttle opening/closing motor 20.

The AMT 16 can include, but is not limited to, a forward six-speed transmission 21, first clutch CL1, second clutch CL2, shift drum 24, and shift control motor 25 that may rotate the shift drum 24. Many gears constituting the transmission 21 can be connected fixedly or loosely to a main shaft 26 and a counter shaft 27. The main shaft 26 can be composed of, but is not limited to, an inner main shaft 26a and an outer main shaft 26b. The inner main shaft 26a can be connected to the first clutch CL1, and the outer main shaft 26b can be connected to the second clutch CL2. Shift gears can be axially and displaceably provided on the main shaft 26 and the counter shaft 27. Shift forks 23 can be engaged at their opposite ends to these shift gears and guide grooves (not shown), which may be formed on the shift drum 24.

A primary drive gear 31 can be connected to an output shaft of the engine 11, i.e., a crankshaft 30. The primary drive gear 31 can be in mesh with a primary driven gear 32. The primary driven gear 32 can be connected through the first clutch CL1 to the inner main shaft 26a and can also be connected through the second clutch CL2 to the outer main shaft 26b. The AMT 16 can further include, but is not limited to, an inner main shaft rotational speed sensor 73 and an outer main shaft rotational speed sensor 74 for respectively detecting the rotational speeds of the inner main shaft 26a and the outer main shaft 26b. The rotational speeds can be detected by measuring the rotational speeds of the predetermined shift gears on the counter shaft 27.

A drive sprocket 35 can be connected to the counter shaft 27, and a drive chain (not shown) can be wrapped around the drive sprocket 35. As a result, a drive force can be transmitted from the counter shaft 27 through the drive chain to a rear wheel as a drive wheel. The AMT 16 can further include an engine speed sensor 36 opposed to the outer circumference of the primary driven gear 32. The AMT can also include a gear position sensor 38 that can detect the gear position according to the rotational position of the shift drum 24. The AMT can include a shift sensor 64 that can detect the rotational position of a shifter driven by the shift control motor 25. The AMT can also include a neutral switch 63 that can detect the neutral position of the shift drum 24. The throttle body 19 can be provided with a throttle angle sensor 47 to detect a throttle angle.

The clutch hydraulic device 17 can use a lubricating oil for the engine 11 as a hydraulic fluid for driving the clutch CL. The clutch hydraulic device 17 can include, but is not limited to, an oil tank 39 and an oil supply passage 40 that may supply oil (hydraulic fluid) from the oil tank 39 to the first clutch CL1 and the second clutch CL2. The oil supply passage 40 can be provided with a hydraulic pump 41 as an oil pressure source and a valve (electronically controlled valve) 42 as a motor driven actuator. A return passage 43 can be connected to the oil supply passage 40, and the return passage 43 can be provided with a regulator 44 that may maintain the oil pressure to be supplied to the valve 42 at a constant value. The valve 42 can have a structure capable of individually applying oil pressures to the first clutch CL1 and the second clutch CL2. The first and second valves 42a and 42b can respectively be provided with oil return passages 45.

The first valve 42a can be connected through a first passage to the first clutch CL1. The first passage can be provided with a first clutch oil pressure sensor 75 that may measure an oil pressure generated in the first clutch CL1. Similarly, the second valve 42b can be connected through a second passage to the second clutch CL2. The second passage can be provided with a second clutch oil pressure sensor 76 that can measure an oil pressure generated in the second clutch CL2.

Connected to the AMT control unit 18 can be a mode switch 49 that may switch between an automatic transmission (AT) mode and a manual transmission (MT) mode. A shift select switch 50 can be connected to control unit 18 so the shift select switch 50 can instruct an upshift (UP) or a downshift (DN). The AMT control unit 18 can also be connected to a neutral select switch 51 that may switch between a neutral position (N) and a drive position (D). The AMT control unit 18 can include, but is not limited to, a central processing unit (CPU) that may control the valve 42 and the shift control motor 25 based on output signals from the sensors and switches mentioned above. Therefore, the gear position in the AMT 16 can be changed either automatically or semi-automatically.

When the AT mode is selected, the AMT control unit 18 can automatically change the gear position based on information such as vehicle speed, engine speed, and throttle angle. When the MT mode is selected, the AMT control unit 18 can upshift or downshift the transmission 21 based on the operation of the shift select switch 50. However, when the MT mode is selected, the AMT control unit 18 can execute auxiliary automatic shift control to prevent the engine from overrevolution and stall.

In the clutch hydraulic device 17, an oil pressure can be applied to the valve 42 by the hydraulic pump 41. The oil pressure can be controlled by the regulator 44 so as not to exceed an upper limit. When the valve 42a or 42b is opened by the instruction from the AMT control unit 18, the oil pressure can be applied to the first clutch CL1 or the second clutch CL2. As a result, the primary driven gear 32 can be connected through the first clutch CL1 or the second clutch CL2 to the inner main shaft 26a or the outer main shaft 26b. Conversely, when the valve 42 is closed to stop the application of the oil pressure, the first clutch CL1 and the second clutch CL2 can be biased so as to be disconnected from the inner main shaft 26a and the outer main shaft 26b by return springs (not shown) built in the respective clutches CL1 and CL2.

The valve 42 for driving the clutches CL1 and CL2 can open or close the first and second passages connecting the oil supply passage 40 to the clutches CL1 and CL2. The valve 42 for driving the clutches CL1 and CL2 can arbitrarily change the time from a full closed condition to a full open condition of the first and second passages based on a drive signal from the AMT control unit 18.

The shift control motor 25 can rotate the shift drum 24 based on the instruction from the AMT control unit 18. When the shift drum 24 is rotated, the shift forks 23 can be selectively displaced in the axial direction of the shift drum 24 based on the shapes of the guide grooves formed on the outer circumference of the shift drum 24. Accordingly, the meshing gears on the counter shaft 27 and the main shaft 26 can be changed to effect upshifting or downshifting in the transmission 21.

In the AMT 16, the odd-numbered gears (first, third, and fifth gears) can support the inner main shaft 26a connected to the first clutch CL1, and the even-numbered gears (second, fourth, and sixth gears) can support the outer main shaft 26b connected to the second clutch CL2. Accordingly, during running with any odd-numbered gear, for example, the supply of an oil pressure to the first clutch CL1 can be continued to maintain the engaged condition of the first clutch CL1. In performing a gear shift from this odd-numbered gear, the next gear position can be preliminarily determined by rotating the shift drum 24, so that the gear shift can be effected by switching the first clutch CL1 to the second clutch CL2.

Referring also to FIG. 2, the odd-numbered drive gears M1, M3, and M5 can support the inner main shaft 26a connected to the first clutch CL1. The first drive gear M1 can be formed integrally with the inner main shaft 26a. The third drive gear M3 can be mounted on the inner main shaft 26a so as to be axially slidable and nonrotatable relative to the inner main shaft 26a. The fifth drive gear M5 can be mounted on the inner main shaft 26*a* so as to be axially nonslidable and rotatable relative to the inner main shaft 26*a*. On the other hand, the even-numbered drive gears M2, M4, and M6 can support the outer main shaft 26*b* connected to the second clutch CL2. The second drive gear M2 can be formed integrally with the outer main shaft 26*b*. The fourth drive gear M4 can be mounted on the outer main shaft 26*b* so as to be axially slidable and nonrotatable relative to the outer main shaft 26*b*. The sixth drive gear M6 can be mounted on the outer main shaft 26*b* so as to be axially nonslidable and rotatable relative to the outer main shaft 26*b*.

A plurality of driven gears C1 to C6 respectively meshing with the drive gears M1 to M6 can support the counter shaft 27. The first to fourth driven gears C1 to C4 can be mounted on the counter shaft 27 so as to be axially nonslidable and rotatable relative to the counter shaft 27. The fifth and sixth driven gears C5 and C6 can be mounted on the counter shaft 27 so as to be axially slidable and nonrotatable relative to the counter shaft 27. In the AMT 16, the drive gears M3 and M4 and the driven gears C5 and C6, i.e., the axially slidable gears can be adapted to be slid by the respective shift forks 23 to engage or disengage any dog clutch, thus performing a gear shift.

When the first gear is selected, for example, the engine torque transmitted from the crankshaft 30 to the primary driven gear 32 can be transmitted through the first clutch CL1 in its engaged condition to the inner main shaft 26*a*. The rotation of the inner main shaft 26*a* can be further transmitted from the first drive gear M1 through the first driven gear C1 to the counter shaft 27. In this case, the dog clutch for the first speed can be engaged between the first driven gear C1 and the fifth driven gear C5.

While the engine torque is being transmitted by the first gear, the dog clutch for the second speed can be preliminarily engaged between the sixth driven gear C6 and the second driven gear C2, thus performing "preliminary shift" such that the gear shift from the first gear to the second gear is awaited. At this time, the second clutch CL2 can be in a disengaged condition. Accordingly, although the dog clutch for the second speed can be engaged during running with the first gear, the engine torque can be transmitted through the second drive gear M2 to the outer main shaft 26*b* to idly rotate the outer main shaft 26*b*. When the second clutch CL2 is engaged and the first clutch CL1 is disengaged after performing the above preliminary shift, the transmission of engine torque can be switched smoothly and instantaneously from the first gear to the second gear.

In the shift drum 24 of the AMT 16, a "neutral waiting" position can be set between the predetermined rotational positions to select the gear positions in such a manner that either the group of the even-numbered gears or the group of the odd-numbered gears, which may not transmit the engine torque, can be brought into a neutral position. Accordingly, the odd-numbered gears can be brought into a neutral position during running with any even-numbered gear, and the even-numbered gears can be brought into a neutral condition during running with any odd-numbered gear.

Figure 3:
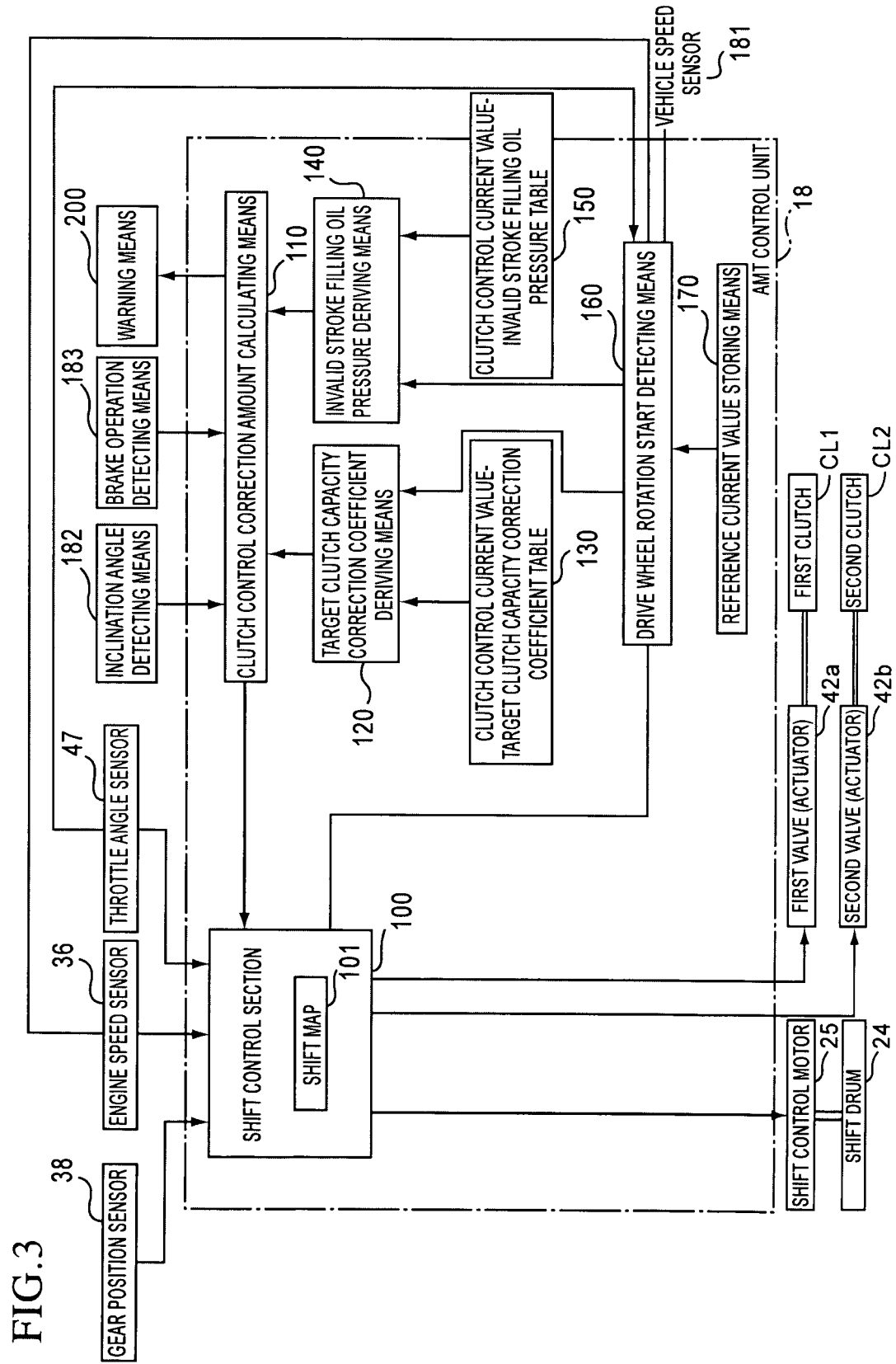
FIG. 3 is a block diagram showing the configuration of an AMT control unit and its peripheral equipment.

FIG. 3 is a block diagram showing the configuration of the AMT control unit 18 and its peripheral equipment according to an embodiment of the invention. In FIG. 3, the same reference numerals as those shown in FIGS. 1 and 2 denote the same or like parts. The AMT control unit 18 can include, but is not limited to, a shift control section 100, which may store a shift map 101. The shift control section 100 can include, but is not limited to, a clutch control means (or a clutch control unit) that may drive the shift control motor 25 and the valve 42 (42*a* or 42*b*) by using the shift map 101 such as a three-dimensional map based on output information and vehicle speed information to perform a shifting operation. The output information can be received from a gear position sensor 38, engine speed sensor 36, and throttle angle sensor 47 and vehicle speed information can be received from a vehicle speed sensor 181 during normal running of the vehicle. Further, at starting the vehicle, the shift control section 100 can perform clutch engagement control including partial clutch engagement control to attain smooth transmission of engine torque.

The shift control section 100 can detect a shift condition such as a condition where the transmission 21 can be shifted based on a shift signal generated in the automatic shifting mode using the shift map 101 or in the semiautomatic shifting mode by the operation of the shift select switch 50. Further, the shift control section 100 can always detect a control current value supplied to the valve 42, or a clutch control amount in driving the clutch.

In driving the clutch from its disengaged condition toward its engaged condition at starting the vehicle, the AMT control unit 18 can detect the timing at which the drive wheel actually starts rotating and can detect the clutch control amount at this timing. Further, the AMT control unit 18 can calculate a control correction amount based on the clutch control amount to correct the clutch control amount. Based on such clutch correction control, the clutch control amount can be increased even when friction in a driving force transmitting system is increased due to aged deterioration or the like. The clutch control amount can also be increased when the clutch plates are worn to cause an increase in invalid stroke of the clutch plates until they come into contact with each other. As a result, a change in starting and shifting feed can be prevented. Further, even when there are variations in quality of the clutch, valve, etc. in manufacturing, a running feel can be made stable.

To make the correction for the clutch control amount as mentioned above, the AMT control unit 18 can include, but is not limited to, a drive wheel rotation start detecting means (or a driver wheel rotation start detector) 160, which may detect that the drive wheel has started rotating, and a clutch control correction amount calculating means (clutch control correction amount calculator) 110, which may calculate the control correction amount according to the difference between the clutch control amount detected at starting the rotation of the drive wheel and a predetermined reference value.

Output signals from the vehicle speed sensor 181, the engine speed sensor 36, and the throttle angle sensor 47 and clutch control amount information from the shift control section 100 can be always inputted into the drive wheel rotation start detecting means 160. The drive wheel rotation start detecting means 160 can detect the timing of start of rotation of the drive wheel according to an output signal from the vehicle speed sensor 181 and can temporarily store the clutch control amount at this timing. This operation will now be described in more detail with reference to FIG. 4.

Figure 4:
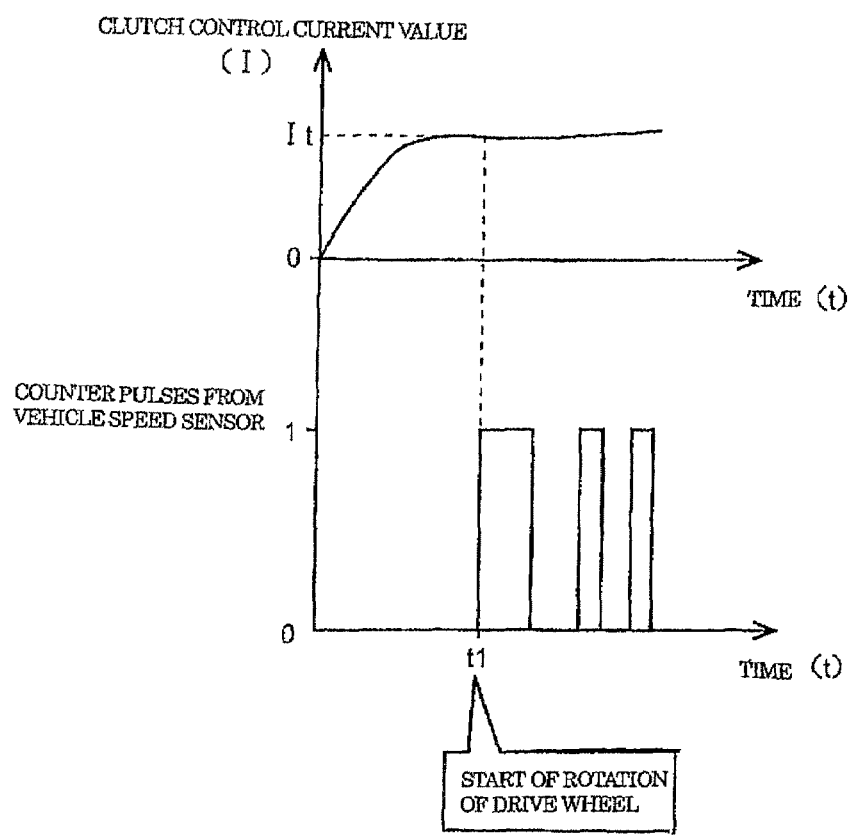
FIG. 4 is a graph showing the relation between counter pulses from a vehicle speed sensor and a clutch control current value.

FIG. 4 is a graph showing the relation between counter pulses as an output signal from the vehicle speed sensor 181 and a clutch control current value. This graph corresponds to the case where the AMT 16 can be switched from the neutral position (N) to the drive position (D) in the vehicle stopped condition and the clutch can be next driven in its engaging direction according to a throttle operation. While the first clutch CL1 can be engaged at starting with the first gear in this embodiment, the second clutch CL2 may be engaged at starting with the second gear.

At the time to, the first clutch CL1 can start to be driven in its engaging direction according to the throttle operation by the operator, so that the clutch control current value as the clutch control amount starts to be raised. However, there can be a slight time lag from the timing of start of rising of the clutch control current value to the timing of start of rotation of the drive wheel. This time lag can depend on the amount of invalid stroke which may be generated from the time the clutch plates of the first clutch CL1 come into contact with each other and until the time a frictional force is generated. The time lag can also depend on the play of splines between the counter shaft 27 and the drive sprocket 35 (see FIG. 1), the slack or friction of the drive chain, the rotational resistance of the axle of the drive wheel, and the rolling friction of tires.

While the control current value supplied to the valve 42 (42a or 42b) can be detected as the clutch control amount in this embodiment, a clutch oil pressure detected by the oil pressure sensor 75 or 76 (see FIG. 1) may be adopted as the clutch control amount.

At the time t1, the first counter pulse can be outputted from the vehicle speed sensor 181 to output a counter pulse signal. The vehicle speed sensor 181 can be adapted to directly detect the rotational speed of the drive wheel. In this embodiment, the timing at which the first counter pulse from the vehicle speed sensor 181 is inverted after detection of the starting operation from the vehicle stopped condition is detected as the timing of start of rotation of the drive wheel. The vehicle speed sensor 181 can be composed of, but not limited to, a pulser ring (not shown) as a sensed element formed with a plurality of projections and depressions and a noncontact type sensor that may detect the passing state of these projections and depressions of the pulser ring rotating together with the drive wheel. The drive wheel rotation start detecting means 160 can temporarily store a clutch control current value It that may be detected at starting of rotation of the drive wheel.

Referring back to FIG. 3, the drive wheel rotation start detecting means 160 can calculate the difference between the clutch control current value It, which may be temporarily stored, and a reference current value, may be stored in reference current value storing means 170. The drive wheel rotation start detecting means 160 can also transmit the difference to a target clutch capacity correction coefficient deriving means (or a target clutch capacity correction coefficient deriver) 120 and an invalid stroke filling oil pressure deriving means (or an invalid stroke filling oil pressure deriver) 140.

The target clutch capacity correction coefficient deriving means 120 can apply the difference between the clutch control current value It and the reference current value to a clutch control value—target clutch capacity correction coefficient table 130. As a result, a target clutch capacity correction coefficient can be derived. The target clutch capacity can be a target value for the maximum engine torque that can be transmitted by the clutch. The target value can be calculated according to various parameters. The shift control section 100 can calculate a target clutch pressure based on the target clutch capacity and can supply a control current generating the target clutch pressure to the valve 42.

On the other hand, the invalid stroke filling oil pressure deriving means 140 can apply the difference between the clutch control current value It and the reference current value to a clutch control current value—invalid stroke filling oil pressure table 150. As a result, an invalid stroke filling oil pressure can be derived. The invalid stroke can be the amount of movement of the clutch plates from the initial position where no oil pressure is supplied to the clutch to the operational position where the clutch plates come into contact with each other. This invalid stroke can be increased because of the wear of the clutch plates, for example, causing a response delay in the clutch engagement control. In this embodiment, the invalid stroke filling oil pressure can be set to be supplied as a preload to the clutch. As a result, the initial position of the clutch toward the operational position can be shifted and the invalid stroke can be reduced (filled). This operation will now be described in more detail with reference to FIG. 5.

Figure 5:
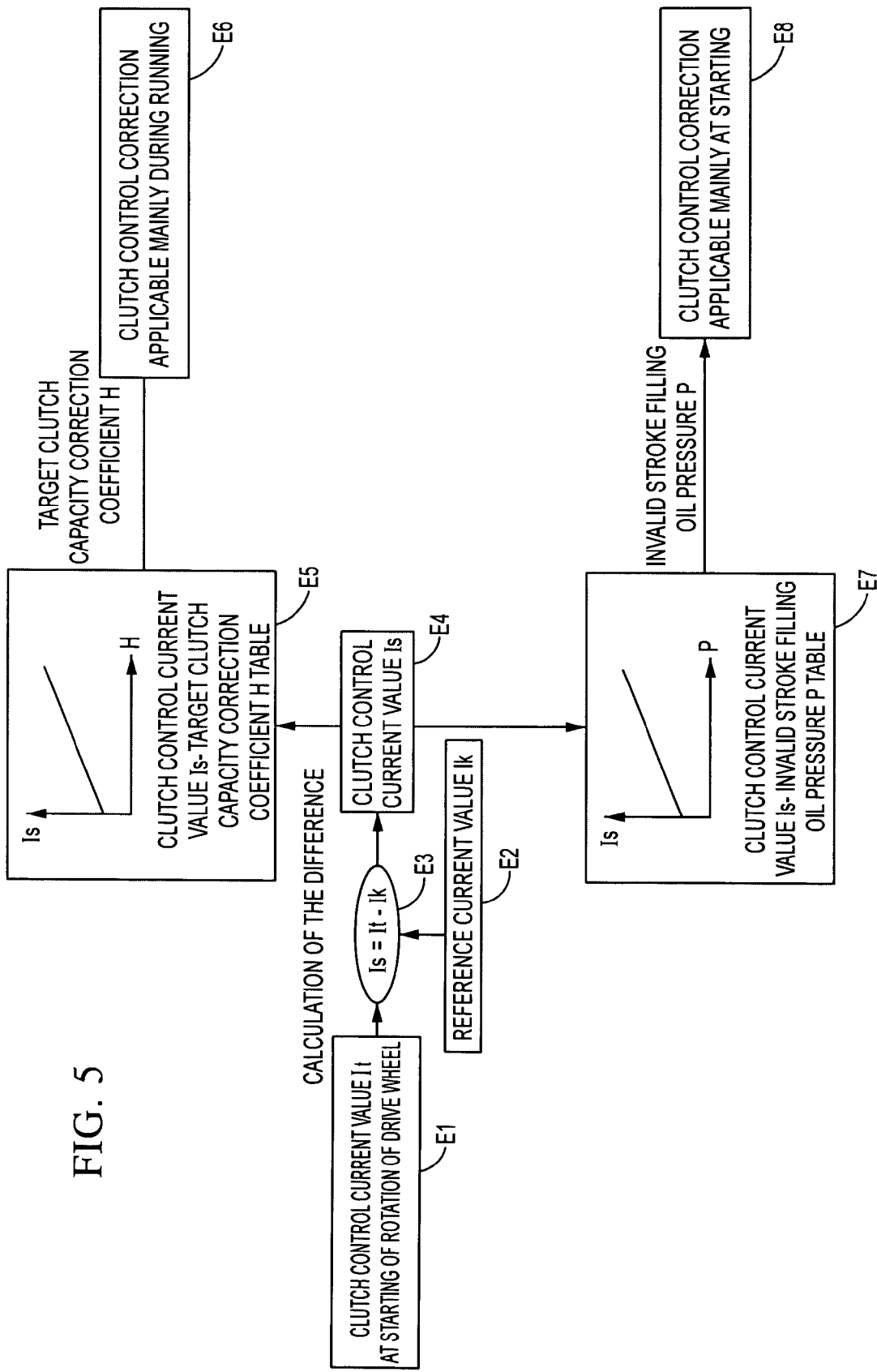
FIG. 5 is a block diagram showing the flow of clutch correction control.

FIG. 5 is a block diagram showing the flow of the clutch correction control by two methods according to the clutch control current value It can be detected at starting of rotation of the drive wheel. First, the clutch control current value It at starting of rotation of the drive wheel can be detected (E1). The difference between the clutch control current value It detected above and the reference current value Ik (E2) can next be calculated in accordance with the equation given by a clutch control current value Is=It−Ik(E3).

The clutch control current value Is (E4) calculated above can next be applied to a clutch control current value Is—target clutch capacity correction coefficient H table. As a result, a target clutch capacity correction coefficient H (E5) can be derived. Simultaneously, the clutch control current value Is can also be applied to a clutch control current value Is—invalid stroke filling oil pressure P table. As a result, an invalid stroke filling oil pressure P (E7) can also be derived.

The target clutch capacity correction coefficient H can be used mainly for the correction of clutch control during running (E6), and the correction coefficient H may have an effect on the magnitude of a clutch pressure for transmitting engine torque and variations in clutch pressure upon shifting. On the other hand, the invalid stroke filling oil pressure P can be used mainly for the correction of invalid stroke filling clutch control at starting (E8). The oil pressure P can have an effect on the time period from the timing of start of driving of the clutch in its disengaged condition to the timing of contact of the clutch plates. In the clutch control device according to this embodiment, the clutch control correction amount to be applied during running and the clutch control correction amount to be applied at starting can be calculated individually according to the clutch control current value Is detected at starting of rotation of the drive wheel.

For example, the control of supplying a preload to the clutch by using the invalid stroke filling oil pressure P may be performed when the neutral position (N) is switched to the drive position (D) by the neutral select switch 51 (see FIG. 1) after starting the drive source in the vehicle. According to such invalid stroke filling control, it can be possible to eliminate a time lag from the timing of detection of a starting operation to the timing of generation of a frictional force in the clutch even when the invalid stroke may be increased due to the wear of the clutch plates. As a result, a running feel can be made stable.

Referring back to FIG. 3, the target clutch capacity correction coefficient H, which can be calculated by the target clutch capacity correction coefficient deriving means 120, and the invalid stroke filling oil pressure P, which can be calculated by the invalid stroke filling oil pressure deriving means 140, can be inputted into the clutch control correction amount calculating means 110. The clutch control correction amount calculating means 110 can use both the target clutch capacity correction coefficient H and the invalid stroke filling oil pressure P to calculate two control correction amounts and can transmit them to the shift control section 100. The shift control section 100 can derive the valve 42 according to these two control correction amounts.

Output signals from inclination angle detecting means 182 and brake operation detecting means 183 can be inputted into the clutch control correction amount calculating means 110. The inclination angle detecting means 182 can include, but is not limited to, a pendulum that may be always pointed downward in a vertical direction, a case that may hold the pendulum, and a sensor that may detect a relative angle between the pendulum and the case. An inclination angle of the vehicle body in its longitudinal direction can be detected according to an output signal from the sensor. The brake operation detecting means 183 can be configured to detect whether or not a brake operation has been performed according to information from a brake lamp switch or a braking pressure sensor (both not shown). The clutch control correction amount calculating means 110 can be connected to a warning means 200 that may warn the operator when predetermined conditions are satisfied.

Figure 6:
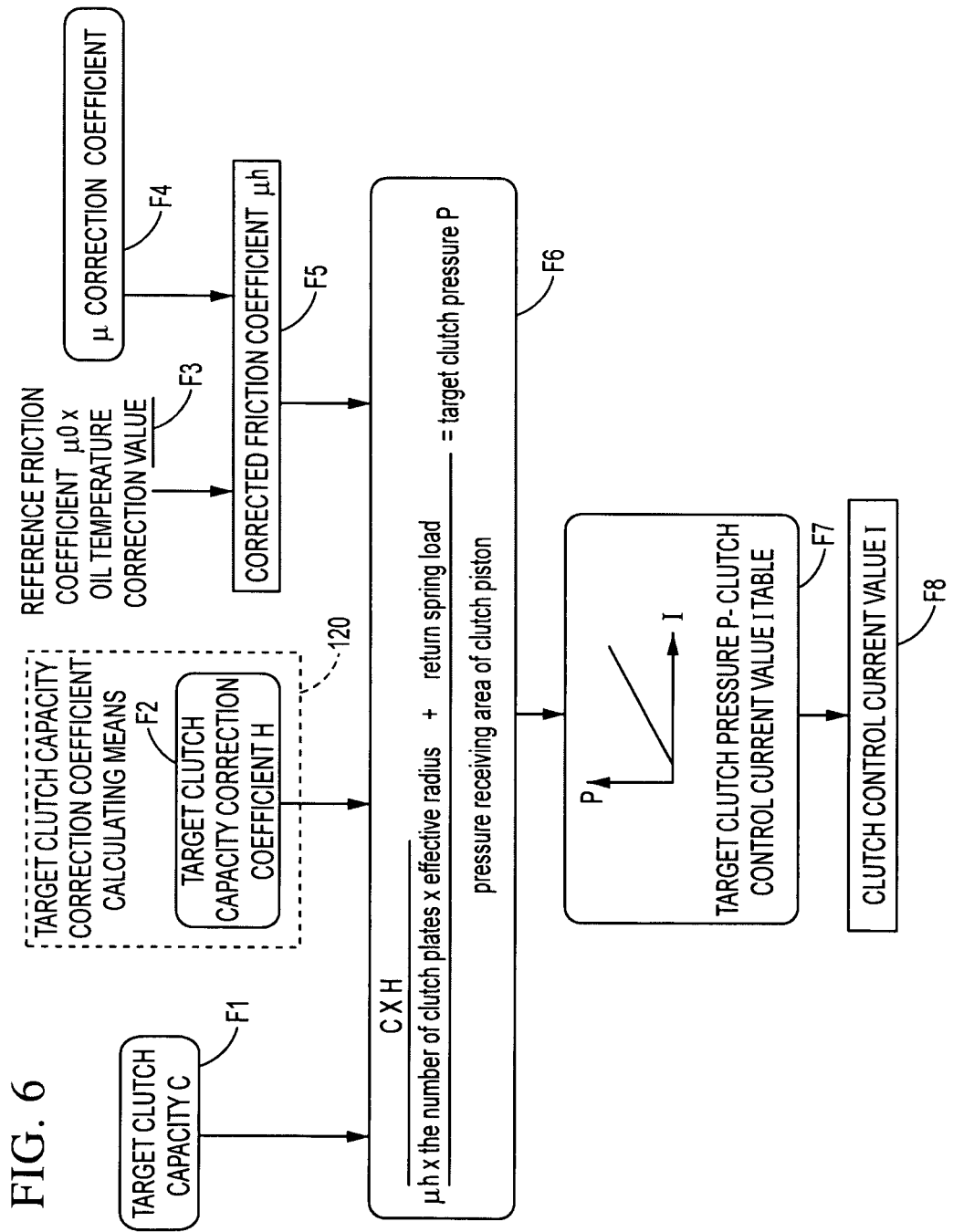
FIG. 6 is a block diagram showing the procedure of calculating a clutch control correction amount applied during running.

FIG. 6 is a block diagram showing the procedure of calculating the clutch control correction amount applied during running by using the target clutch capacity correction coefficient H. First, in block F1, a target clutch capacity C can be calculated according to engine torque or the like generated during running. Next, in block F2, a target clutch capacity correction coefficient H as a correction coefficient for the target clutch capacity C can be calculated in the target clutch capacity correction coefficient deriving means 120 (see FIG. 3).

On the other hand, in block F5, a value obtained by the expression of reference friction coefficient μ0×oil temperature correction value (block F3) can be multiplied by a predetermined μ correction coefficient (block F4) to calculate a corrected friction coefficient μh. Next, in block F6, a target clutch pressure P can be calculated by using the target clutch capacity C, the target clutch capacity correction coefficient H, and the corrected friction coefficient μh. As shown in block F6, the target clutch pressure P can be obtained by the expression of {(C×H/μh×the number of clutch plates×effective radius)+return spring load}/pressure receiving area of clutch piston. Next, in block F7, the target clutch pressure P can be applied to a target clutch pressure P—clutch control current value I table to derive a corrected clutch control current value I in block F8. The corrected clutch control current value I can be applicable not only to the clutch control upon shifting during running, but also to the partial clutch engagement control at starting.

While the target clutch capacity correction coefficient H is obtained according to the difference between the clutch control amount detected at starting of rotation of the drive wheel and the reference value in this embodiment, a correction coefficient for the target clutch pressure P may be obtained instead.

Figure 7:
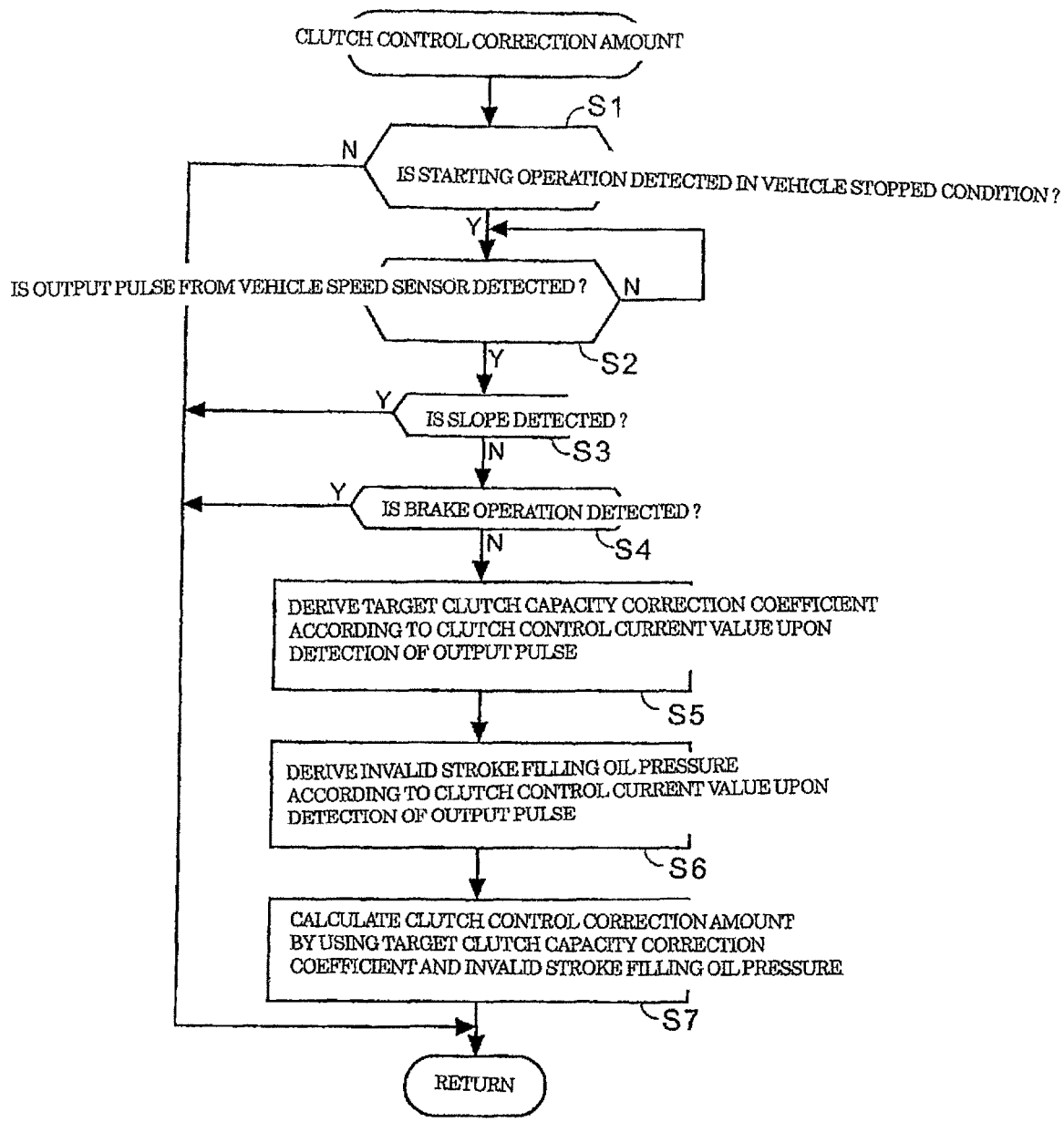
FIG. 7 is a flowchart showing the flow of clutch control correction amount calculation processing.

FIG. 7 is a flowchart showing the flow of clutch control correction amount calculation processing. This flowchart corresponds to the flow of the correction control procedure shown in FIG. 5. First, in step S1, it can be determined whether or not a starting operation is detected in the vehicle stopped condition. If the answer in step S1 is affirmative, the program proceeds to step S2. The starting operation by the operator can be detected when the neutral position (N) may be switched to the drive position (D) by the neutral select switch 51 and the engine speed starts to be increased by the throttle operation. Further, the vehicle stopped condition can be detected according to an output signal from the vehicle speed sensor 181.

In step S2, it can be determined whether or not an output pulse from the vehicle speed sensor 181 is detected. If the answer in step S2 is affirmative, the program proceeds to step S3. If the answer in step S2 is negative, the program can return to step S2. If the answer in step S1 is negative, the program can be ended because this case is a vehicle running condition, for example, and is not suitable for the calculation of a control correction amount.

In step S3, it can be determined whether or not the vehicle is inclined in its longitudinal direction, i.e., whether or not the road surface on which the vehicle is at rest is sloping, by the inclination angle detecting means 182 (see FIG. 3). If the answer in step S3 is affirmative, the program can be ended because this case is a starting condition on an upward or downward slope and may not be suitable for the calculation of a control correction amount. If the answer in step S3 is negative, the program can proceed to step S4 to determine whether or not a brake operation is performed by the brake operation detecting means 183. If the answer in step S4 is affirmative, the program can be ended because this case is a condition where a braking force is applied to the vehicle and is not suitable for the calculation of a control correction amount.

If the answer in step S4 is negative, it can be determined that this case is a condition suitable for the calculation of a clutch control correction amount and the program proceeds to step S5. In step S5, a target clutch capacity correction coefficient can be derived by the target clutch capacity correction coefficient deriving means 120 (see FIG. 3) according to the clutch control current value detected upon detection of the counter pulse from the vehicle speed sensor 181, i.e., at starting of rotation of the drive wheel. In step S6, an invalid stroke filling oil pressure can be derived by the invalid stroke filling oil pressure deriving means 140 according to the clutch control current value detected upon detection of the counter pulse. In step S7, a clutch control correction amount can be calculated by the clutch control amount calculating means 110 by using the target clutch capacity correction coefficient and the invaluḍ stroke filling oil pressure. Thereafter, the program can be ended.

The calculation of the clutch control correction amount may be performed according to the average of amounts of movement of the vehicle after making a plurality of detections of the clutch control amount at starting of rotation of the drive wheel. Accordingly, even when the clutch control amount at starting of rotation of the drive wheel is suddenly varied due to unevenness or gravel on a road surface, the influence by such variations in clutch control amount can be eliminated.

In the case that the clutch control amount detected at starting of rotation of the drive wheel exceeds a predetermined value, this clutch control amount is not applied to the control correction amount calculation processing shown in FIG. 7 and a warning can be given to the operator by the warning means 200 such as a warning lamp or a speaker. Accordingly, it is possible to urge the operator to check the wear of the clutch plates, the degradation of engine oil, and any abnormality in the power transmitting system from the clutch to the drive wheel.

The control correction amount calculation processing according to this embodiment can be applied not only to the correction for the bad engaged condition of the clutch due to aged deterioration or the like, but also to initial setting prior to shipment of the vehicle from a factory. In this case, variations in accuracy of the valve and the clutch can be absorbed to unify the clutch settings.

In the case that the throttle angle measured at starting is smaller than a predetermined value or in the case that the rate of change in throttle angle at starting is larger than a predetermined value, the control correction amount calculation processing may be suspended. Accordingly, the conditions upon detection of the clutch control amount can be made stable to execute proper operational processing. In the case that the various conditions mentioned above are satisfied to suspend the calculation of the control correction amount, the clutch control amount may be decided according to the control correction amount already calculated.

According to the clutch control device according to the invention, the clutch control amount at starting of rotation of the drive wheel of the vehicle after driving the clutch in its engaging direction is detected, and the clutch control amount is corrected according to this control amount detected above. Accordingly, even when the clutch control amount at starting of rotation of the drive wheel is varied due to variations in quality of the clutch in manufacturing or an increase in friction in the driving force transmitting system, the clutch control can be performed by applying a control correction amount according to the above variations in clutch control amount. As a result, a shifting feel at starting or during running can be made stable.

The configuration of the clutch and the valve, the configuration of the vehicle speed sensor, the configuration of the clutch control current value—target clutch capacity correction coefficient table and the clutch control current value—invalid stroke filling oil pressure table, the setting of the reference clutch control current value, the calculation method for the target clutch pressure, the detection method for the starting operation, for example, are not limited to those embodiments described above, but various modifications may be made. The clutch control device according to the invention is applicable not only to a motorcycle, but also to a three-wheel vehicle and a four-wheel vehicle, for example.

In accordance with an embodiment of the invention, a clutch control device may be provided for a clutch that can connect and disconnect the transmission of a rotational drive force from a power source to a drive wheel in a vehicle. The clutch control device can include a clutch control means that can control a control amount for the clutch. The clutch control device can include a drive wheel rotation start detecting means that can detect the start of rotation of the drive wheel. The clutch control device can include a control correction amount calculating means that can calculate a control correction amount for the clutch based on the difference between the clutch control amount detected at starting of rotation of the drive wheel and a predetermined reference value. The clutch control means can apply the control correction amount to the control amount for the clutch to thereby control the clutch.

In accordance with another embodiment of the invention, the control correction amount calculating means can calculate a control correction amount to be applied to clutch control during running of the vehicle and a control correction amount to be applied to invalid stroke filling control at starting of the vehicle.

In accordance with another embodiment of the invention, the drive wheel rotation start detecting means can detect the start of rotation from the stopped condition of the drive wheel based on an output pulse from a vehicle speed sensor for directly detecting a rotational speed of the drive wheel.

In accordance with another embodiment of the invention, the clutch control device can also include an inclination angle detecting means that may detect an inclination angle of the vehicle in its longitudinal direction. When the inclination angle is larger than a predetermined value, the control correction amount calculating means can suspend the calculation of the control correction amount.

In accordance with another embodiment of the invention, the clutch control device can include a brake operation detecting means that may detect a brake operation in the vehicle. When the brake operation is detected, the control correction amount calculating means can suspend the calculation of the control correction amount.

In accordance with another embodiment of the invention, the clutch can be a twin clutch type clutch that may include a first clutch and a second clutch provided on a main shaft. The engaged condition of the first clutch and the engaged condition of the second clutch can be alternately switched every time a shift operation is performed. As a result, the rotational drive force is transmitted from the power source to the drive wheel.

In accordance with another embodiment of the invention, the clutch control device can include a warning means that can warn. When the control correction amount exceeds a predetermined value, the control correction amount calculating means can give the warning through the warning means.

In accordance with another embodiment of the invention, the clutch can be driven by an actuator, and the control amount for the clutch can be a control current value supplied to the actuator.

In accordance with another embodiment of the invention, the clutch can be a hydraulic clutch, and the control amount for the clutch can be an oil pressure generated in the clutch.

According to another embodiment of the invention, the control correction amount calculating means can calculate the clutch control correction amount based on the difference between the clutch control amount detected at starting of rotation of the drive wheel and the predetermined reference value. The clutch control means can apply the clutch control correction amount calculated above to the clutch control amount to control the clutch. Accordingly, even when the clutch control amount at starting of rotation of the drive wheel is varied due to variations in quality of the clutch in manufacturing or an increase in friction in a driving force transmitting system, the clutch control can be performed by applying a control correction amount according to the above variations in clutch control amount. As a result, a shifting feel at starting or during running can be made stable.

According to another embodiment of the invention, the control correction amount calculating means can calculate a control correction amount to be applied to clutch control during running of the vehicle and a control correction amount to be applied to invalid stroke filling control at starting of the vehicle. The control correction amount during running can have an effect on the magnitude of a clutch pressure that can transmit a rotational drive force and variations in clutch pressure upon shifting. However, the control correction amount at starting can have an effect on the time period from the timing of start of driving of the clutch in its engaging direction to the timing of contact of the clutch plates. Accordingly, both of the control correction amount during running and the control correction amount at starting can be calculated according to the clutch control amount detected at starting of rotation of the drive wheel.

According to another embodiment of the invention, the drive wheel rotation start detecting means can detect the start of rotation from the stopped condition of the drive wheel based on an output pulse from a vehicle speed sensor to directly detect a rotational speed of the drive wheel. Accordingly, the timing of start of rotation of the drive wheel can be accurately detected.

According to another embodiment of the invention, the clutch control device can include an inclination angle detecting means that may detect an inclination angle of the vehicle in its longitudinal direction. When the inclination angle is larger than a predetermined value, the control correction amount calculating means can suspend the calculation of the control correction amount. Accordingly, in the case that a proper control correction amount cannot be calculated at starting on an upward or downward slope, the operational processing by the control correction amount calculating means can be suspended to reduce the burden on the control correction amount calculating means.

According to another embodiment of the invention, the clutch control device can include a brake operation detecting means that may detect a brake operation in the vehicle. When the brake operation is detected, the control correction amount calculating means can suspend the calculation of the control correction amount. Accordingly, in the case that a proper control correction amount cannot be calculated due to the brake operation, the operation processing by the control correction amount calculating means can be suspended to reduce the burden on the control correction amount calculating means.

According to another embodiment of the invention, the clutch can be a twin clutch type clutch that may include a first clutch and a second clutch, which can be provided on a main shaft. The engaged condition of the first clutch and the engaged condition of the second clutch can be alternately switched every time a shift operation is performed to transmit the rotational drive force from the power source to the drive wheel. Accordingly, the clutch control using the control correction amount can be performed also in a twin clutch type transmission.

According to another embodiment of the invention, the clutch control device can include a warning means that may give a warning. When the control correction amount exceeds a predetermined value, the control correction amount calculating means can give the warning through the warning means. Accordingly, the operator can acknowledge that the clutch control amount required for the start of rotation of the drive wheel has become large, and it may be possible to urge the operator to check the wear of the clutch plates and any abnormality in the power transmitting system from the clutch to the drive wheel.

According to another embodiment of the invention, the clutch can be driven by an actuator. The control amount for the clutch can be a control current value supplied to the actuator. Accordingly, the clutch control amount can be easily obtained from an output signal for driving the actuator.

According to another embodiment of the invention, the clutch can be a hydraulic clutch. The control amount for the clutch can be an oil pressure generated in the clutch. Accordingly, the clutch control amount can be easily obtained from an output value from an oil pressure sensor or the like provided on a hydraulic line for the clutch.

Description of Reference Symbols

11: Engine (power source),
16: AMT,
18: AMT control unit,
25: Shift control motor,
26: Main shaft,
26a: Inner main shaft,
26b: Outer main shaft,
27: Counter shaft,
36: Engine speed sensor,
42: Valve,
42a: First valve,
42b: Second valve,
47: Throttle angle sensor,
100: Shift control section (or a clutch control means),
101: Shift map,
110: Clutch control correction amount calculating means (or a clutch control correction amount calculator),
120: Target clutch capacity correction coefficient deriving means (or a target clutch capacity correction coefficient deriver),
140: Invalid stroke filling oil pressure deriving means (or an invalid stroke filling oil pressure deriver),
160: Drive wheel rotation start detecting means (or a drive wheel rotation start detector),
170: Reference current value storing means (or a reference current value storage),
181: Vehicle speed sensor,
M1 to M6: First to sixth drive gear,
C1 to C6: First to sixth driven gear,
CL1: First clutch, and
CL2: Second clutch.

We claim:

1. A clutch control device for a clutch to connect and disconnect the transmission of a rotational drive force from a power source to a drive wheel in a vehicle, said clutch control device comprising:

clutch control means for controlling a control amount of said clutch;

drive wheel rotation start detecting means for detecting a start of rotation of said drive wheel; and control correction amount calculating means for calculating two control correction amounts of said clutch based on a difference between the clutch control amount detected at the start of rotation of said drive wheel and a predetermined reference value, wherein said control correction amount calculating means calculates a first control correction amount of the two control correction amounts to be applied to clutch control during running of said vehicle, wherein said control correction amount calculating means calculates a second control correction amount of the two control correction amounts to be applied to a reduction control of an invalid stroke at starting of said vehicle, wherein the invalid stroke is an amount of a movement of a plurality of clutch plates of the clutch from an initial position to an operational position where the plurality of clutch plates come into contact with each other, wherein said clutch control means applies said control correction amounts to the control amount of said clutch to control said clutch.

2. The clutch control device according to claim 1, wherein said drive wheel rotation start detecting means detects the start of rotation from a stopped condition of said drive wheel based on an output pulse from a vehicle speed sensor to directly detect a rotational speed of said drive wheel.

3. The clutch control device according to claim 1, further comprising:

inclination angle detecting means for detecting an inclination angle of said vehicle in its longitudinal direction, wherein said control correction amount calculating means suspends the calculation of said control correction amount when said inclination angle is larger than a predetermined value.

4. The clutch control device according to claim 1, further comprising:

brake operation detecting means for detecting a brake operation in said vehicle, wherein said control correction amount calculating means suspends the calculation of said control correction amount when said brake operation is detected.

5. The clutch control device according to claim 1, wherein said clutch comprises a twin clutch type clutch including a first clutch and a second clutch provided on a main shaft;

wherein an engaged condition of said first clutch and an engaged condition of said second clutch is alternately switched every time a shift operation is performed to transmit the rotational drive force from said power source to said drive wheel.

6. The clutch control device according to claim 1, further comprising:
    warning means for giving a warning,
    wherein said control correction amount calculating means gives the warning through said warning means when said control correction amount exceeds a predetermined value.

7. The clutch control device according to claim 1, wherein said clutch is driven by an actuating means, and
    wherein the control amount of said clutch comprises a control current value supplied to said actuating means.

8. The clutch control device according to claim 1, wherein said clutch comprises a hydraulic clutch, and
    wherein the control amount of said clutch comprises an oil pressure generated in said clutch.

9. A clutch control device for a clutch to connect and disconnect the transmission of a rotational drive force from a power source to a drive wheel in a vehicle, said clutch control device comprising:
    a clutch control unit configured to control a control amount for said clutch;
    a drive wheel rotation start detector configured to detect a start of rotation of said drive wheel; and
    a control correction amount calculator configured to calculate two control correction amounts of said clutch based on a difference between the clutch control amount detected at the start of rotation of said drive wheel and a predetermined reference value,
    wherein said control correction amount calculator is further configured to calculate a first control correction amount of the two control correction amounts to be applied to clutch control during running of said vehicle,
    wherein said control correction amount calculator is further configured to calculate a second control correction amount of the two control correction amounts to be applied to a reduction control of an invalid stroke at starting of said vehicle, wherein the invalid stroke is an amount of a movement of a plurality of clutch plates of the clutch from an initial position to an operational position where the plurality of clutch plates come into contact with each other,
    wherein said clutch control unit is further configured to apply said control correction amounts to the control amount for said clutch to control said clutch.

10. The clutch control device according to claim 9, wherein said drive wheel rotation start detector is further configured to detect the start of rotation from a stopped condition of said drive wheel based on an output pulse from a vehicle speed sensor to directly detect a rotational speed of said drive wheel.

11. The clutch control device according to claim 9, further comprising:
    an inclination angle detector configured to detect an inclination angle of said vehicle in its longitudinal direction,
    wherein said control correction amount calculator suspends the calculation of said control correction amount when said inclination angle is larger than a predetermined value.

12. The clutch control device according to claim 9, further comprising:
    a brake operation detector configured to detect a brake operation in said vehicle,
    wherein said control correction amount calculator suspends the calculation of said control correction amount when said brake operation is detected.

13. The clutch control device according to claim 9, wherein said clutch comprises a twin clutch type clutch including a first clutch and a second clutch provided on a main shaft;
    wherein an engaged condition of said first clutch and an engaged condition of said second clutch is alternately switched every time a shift operation is performed to transmit the rotational drive force from said power source to said drive wheel.

14. The clutch control device according to claim 9, further comprising:
    a warning unit configured to provide a warning,
    wherein said control correction amount calculator gives the warning through said warning unit when said control correction amount exceeds a predetermined value.

15. The clutch control device according to claim 9, wherein said clutch is driven by an actuator, and
    wherein the control amount of said clutch comprises a control current value supplied to said actuator.

16. The clutch control device according to claim 9, wherein said clutch comprises a hydraulic clutch, and
    wherein the control amount of said clutch comprises an oil pressure generated in said clutch.

17. A clutch control method for connecting and disconnecting the transmission of a rotational drive force from a power source to a drive wheel in a vehicle, said clutch control method comprising:
    controlling, by a clutch control unit, a control amount for said clutch;
    detecting, by a drive wheel rotation start detector, a start of rotation of said drive wheel;
    calculating, by a control correction amount calculator, two control correction amounts for said clutch based on a difference between the clutch control amount detected at the start of rotation of said drive wheel and a predetermined reference value;
    calculating, by said control correction amount calculator, a first control correction amount of the two control correction amounts to be applied to clutch control during running of said vehicle;
    calculating, by said control correction amount calculator, a second control correction amount of the two control correction amounts to be applied to a reduction control of an invalid stroke at starting of said vehicle, wherein the invalid stroke is an amount of a movement of a plurality of clutch plates of the clutch from an initial position to an operational position where the plurality of clutch plates come into contact with each other; and
    applying, by said clutch control unit, said control correction amounts to the control amount of said clutch to control said clutch.

18. The clutch control method according to claim 17, further comprising:
    detecting, by said drive wheel rotation start detector, the start of a rotation from a stopped condition of said drive wheel based on an output pulse from a vehicle speed sensor to directly detect a rotational speed of said drive wheel.

19. The clutch control method according to claim 17, further comprising:
    detecting, by an inclination angle detector, an inclination angle of said vehicle in its longitudinal direction; and
    suspending the calculation of said control correction amount when said inclination angle is larger than a predetermined value.

20. The clutch control method according to claim 17, further comprising:
   detecting, by a brake operation detector, a brake operation in said vehicle; and
   suspending the calculation of said control correction amount when said brake operation is detected.

21. The clutch control method according to claim 17, further comprising:
   configuring said clutch to be a twin clutch type clutch comprising a first clutch and a second clutch provided on a main shaft; and
   alternatively switching an engaged condition of said first clutch and an engaged condition of said second clutch every time a shift operation is performed to transmit the rotational drive force from said power source to said drive wheel.

22. The clutch control method according to claim 17, further comprising:
   configuring a warning unit to provide a warning; and
   warning through said warning unit when said control correction amount exceeds a predetermined value.

23. The clutch control method according to claim 17, further comprising:
   driving said clutch by an actuator; and
   configuring the control amount of said clutch to be a control current value supplied to said actuator.

24. The clutch control method according to claim 17, further comprising:
   configuring said clutch to be a hydraulic clutch; and
   configuring the control amount of said clutch to be an oil pressure generated in said clutch.

\* \* \* \* \*